United States Patent
Baldwin, Jr. et al.

(10) Patent No.: US 7,914,756 B2
(45) Date of Patent: Mar. 29, 2011

(54) DOUBLE REPLACEMENT CATION NEUTRALIZATION OF HIGH ALKALINITY WASTE MATERIALS

(76) Inventors: Philip N. Baldwin, Jr., Colorado Springs, CO (US); Norman K. Murray, Covington, LA (US); Charles Richard Lee, Vicksburg, MS (US); Michael W. Farrall, Cary, NC (US)

( * ) Notice: Subject to any disclaimer, the term of this patent is extended or adjusted under 35 U.S.C. 154(b) by 922 days.

(21) Appl. No.: 10/543,241

(22) PCT Filed: Nov. 10, 2003

(86) PCT No.: PCT/US03/35730
§ 371 (c)(1),
(2), (4) Date: Jul. 26, 2005

(87) PCT Pub. No.: WO2005/047183
PCT Pub. Date: May 26, 2005

(65) Prior Publication Data
US 2006/0051286 A1    Mar. 9, 2006

(51) Int. Cl.
*C01F 11/00* (2006.01)

(52) U.S. Cl. ........ 423/127; 423/164; 423/183; 423/104; 423/50; 423/140; 423/141; 423/142; 423/144; 210/702

(58) Field of Classification Search .................. 423/183, 423/127, 164, 140–144, 50, 104; 210/702, 210/723, 726
See application file for complete search history.

(56) References Cited

U.S. PATENT DOCUMENTS

| | | | | |
|---|---|---|---|---|
| 2,632,732 A | * | 3/1953 | Steele et al. | 210/710 |
| 4,913,835 A | * | 4/1990 | Mandel et al. | 252/190 |
| 5,246,596 A | * | 9/1993 | Baldwin et al. | 210/750 |
| 5,531,906 A | * | 7/1996 | Takayama et al. | 210/712 |

* cited by examiner

*Primary Examiner* — Steven Bos
(74) *Attorney, Agent, or Firm* — Albert Haegele; Leyendecker & Lemire, LLC

(57) ABSTRACT

A method of treating alkaline industrial by-products, such as red mud generated by Bayer process bauxite refining, is described. Embodiments of the method comprise treating the alkaline industrial by-products with salts of divalent and/or polyvalent cations, thereby lowering pH of the alkaline industrial by-products. The method involves replacement reactions in which relatively insoluble hydroxide salts form precipitates, thereby removing hydroxide ions from solution.

7 Claims, 5 Drawing Sheets

DOUBLE REPLACEMENT CATION NEUTRALIZATION OF HIGH ALKALINITY WASTE MATERIALS

FIELD OF THE INVENTION

Figure 1:
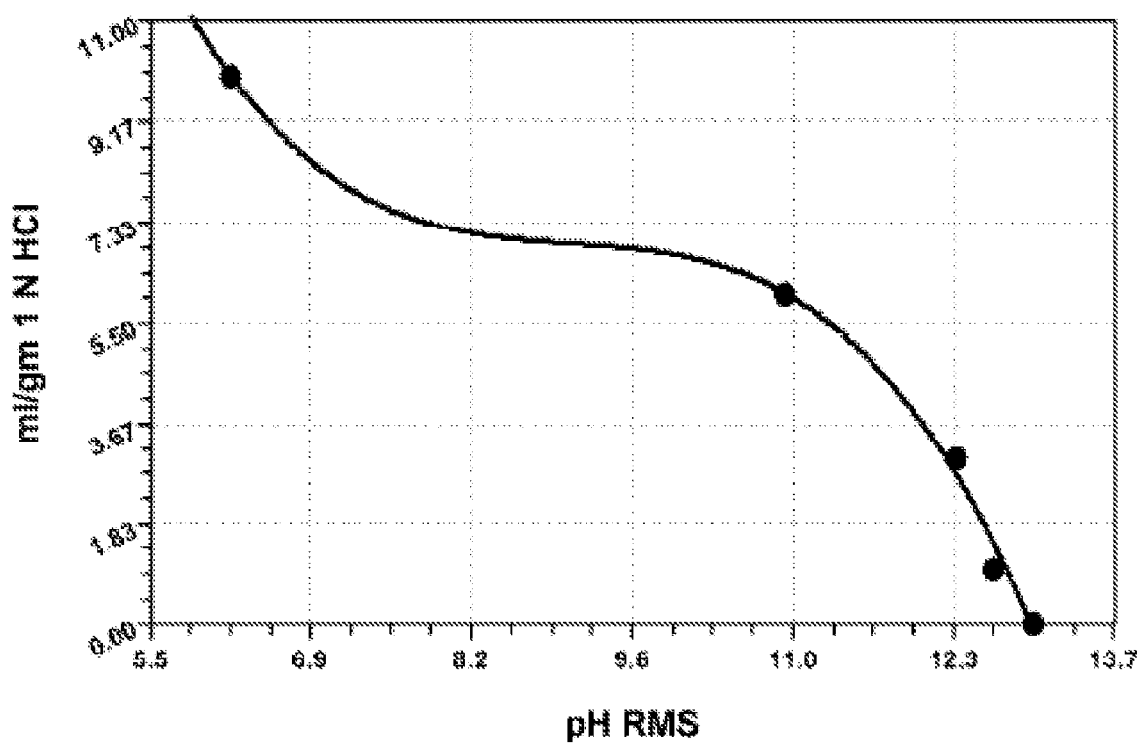

This invention is involved with the treatment of waste and byproduct materials to render them more suitable for disposal or reuse by partially or significantly reducing the material's pH. Specifically, this invention relates to the treatment of moderate to highly hydroxide alkalinity bearing wastes and by-products.

BACKGROUND

There appears to be no patented art in the field of waste alkalinity reduction using inorganic salts; most if not all current technology regarding high alkalinity reduction is done through the long standing method of using mineral acid. The invention shown below is the only current technology found in our patent search, but it does not utilize any of the technology contained in this new application.

Abstract of U.S. Pat. No. 4,913,835

This invention relates to novel compositions and methods for neutralization and solidification of hazardous alkali spills. A dry particulate composition containing an organic neutralizing acid and, materials having varying adsorption rates may be used to neutralize alkaline spills, and solidify the spills to render them harmless. These compositions may be applied to the spills by fire extinguisher-like delivery devices which spread the compositions on the spills from a relatively safe distance without splattering the hazardous materials.

Description of Preferred Embodiments of U.S. Pat. No. 4,913,835

The compositions of this invention preferably contain between about 45% and about 80% by weight of organic neutralizing acid in a dry particulate form such as citric acid, fumaric acid, tartaric acid or benzoic acid, between about 5% to about 45% by weight of a highly absorptive clay such as attapulgite, perlite, fullers earth or Minugel.RTM and the like, optionally between about 10% to about 45% by weight of less absorptive clay, such as attapulgus clay and the like and between about 0.5% and about 10% by weight of a water soluble weak acid salt such as sodium dihydrogen phosphate, magnesium stearate, tricalcium phosphate, aluminum octoate, sodium stearate, monosodium salt of dimethyl naphthalene sulfonate, sodium polyacrylate, and the like.

Abstract of U.S. Pat. No. 5,246,596

Disclosed is a method for processing waste to render it fit for ultimate disposal. The method comprises first contacting together in a reaction mixture the waste stream, an ammonia source capable of evolving ammonia for treating the waste, $Ca(OH)_2$, pozzolanic chemicals $SiO_2$, $Fe_2O_3$, and $Al_2O_3$, and at least one pozzolanic accelerator selected from the group consisting of anionic metal silicates, anionic carbon compounds, anionic boron compounds (borate family), anionic phosphorous compounds (phosphate family), and gelling enhancers, in a manner suitable to cause pozzolanic stabilization reactions to occur thereby increasing the solids percentage of the reaction mixture. Next, the reaction mixture is allowed to reach a target temperature of at least about 90° C., to reach a pH of at least about 11.5, and to evolve ammonia gas, thereby forming a heated mixture. Finally, the exposed surface area to mass ratio of the solids in the heated mixture is increased in a manner suitable to release the evolved ammonia gas, thereby neutralizing a substantial portion of the pathogens present in the waste stream and forming a treated waste stream that is suitable for ultimate disposal.

DETAILED DESCRIPTION

A method of treating hydroxide alkaline waste and by-products to render the material neutralized or reduced in pH from near 14 to a minimum lower limit of about 5.3 based on aluminum poly cation salts, rendering the waste or by-product stream suitable for ultimate disposal or reuse. The method comprises contacting together a mixture of moderate to high alkaline waste or by-product material with a pH in the range of 7.5-14, with sufficient water added or found within the alkaline material, with one or more poly cationic salts in the dry form taken from a group of salts containing trivalent aluminum, trivalent iron, divalent calcium, divalent magnesium, divalent manganese, divalent zinc, or any polyvalent cationic salt that is soluble in water to a minimum extent of 0.5 grams per 100 milliliters of water at near 0° C. and 2 grams per 100 milliliters of water at near 100° C., in such a way to cause these materials to interact in a double replacement reaction to form a soluble salt reaction by-product and an insoluble hydroxide precipitate.

The added salts may be dry or made up of a brine or dilute salt solution of the chosen salt or salts from the set of poly cation salts suitable to reduce hydroxide alkalinity in waste and by-product materials causing the pH to drop immediately upon thorough mixing of the poly cation salts and the waste/product materials, resulting in a treated waste/by-product stream/that is suitable for ultimate disposal or reuse.

Neutralization of Alkaline Wastes or by-Products

This invention is about the neutralization of high through low level alkalinity with pH values in the range of 14-7.5 found in waste and by-product liquids, slurries, sludges and high solids systems that are capable of being water diluted. This neutralization is completed through the use of low cost, low to non toxic, environmentally friendly polyvalent cation salts. The resulting treated pH values can be anywhere from about 13.9 to approximately 5.3. These salts may be introduced in the dry form or in a variety of brine concentrations for maximum treatment efficiency. The salt addition may be of one active salt or it may be of a blend of salts some of which may be inactive single valent salts like potassium and sodium chloride. The active ingredient salts are based on polyvalent cations that are soluble in water to at least an extent of 0.5 gram in 100 grams of water at 0° C. or 1 gram per 100 milliliters (mL) of distilled water at 100° C. Preferable solubilities would be in excess of 15 grams per 100 mL of distilled water at 20° C. The reactions of these salts are first order and will happen at once when fully mixed into the waste or by-product. When the salt formula is added dry, the reaction is seen in less than 5 minutes or when complete mixing and dissolution occurs. Heavier and thicker solid slurries will cause a brief delay in full mixing and dissolution but in all studied cases, the reduction of the pH of the material to approximately its final pH is typically less than 15 minutes.

The examples of suitable polyvalent salts, based on the typical commercial quantity cost of each salt, its ready availability and overall effectiveness are: (1) ammonium aluminum alum, (2) aluminum sulfate anhydrous, (3) aluminum sulfate.$18H_2O$, (4) magnesium chloride anhydrous, (5) magnesium sulfate anhydrous, (6) magnesium sulfate.$7H_2O$, (7) calcium chloride anhydrous, (8) manganese chloride, (9) manganese chloride.$4H_2O$, (10) Sodium iron alum, (11) Zinc sulfate, (12) Zinc sulfate.$7H_2O$.

It should be noted that any polyvalent cation salt that is sufficiently soluble in water in the range of near freezing to near boiling, and will carry out a double replacement reaction may be used in this invention to reduce hydroxide alkalinity in water, slurry and sludges with sufficient water to dissolve the salt following adequate mixing. The addition of these salts causes water to separate from slurries and sludges.

Three balanced chemical equation examples of the caustic alkalinity removal chemistry by the double replacement reaction are found in the following formulas [I]:

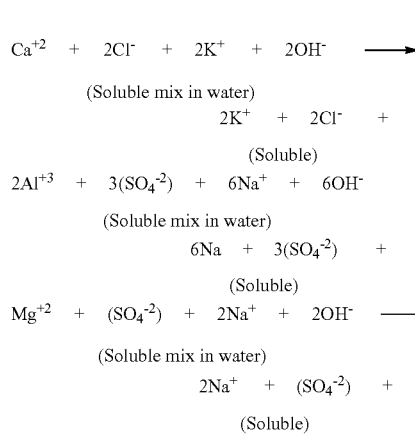

Solubility in water for the hydroxide salts shown in [I] are: 0.185 g per 100 mL H2O at 212° F. for $Ca(OH)_2$; <0.009 g per 100 mL H2O at 68° F. for $Al(OH)_3$; and 0.004 g per 100 mL H2O at 212° F. and 0.0009 g at 68° F. for $Mg(OH)_2$.

A method of determining the effectiveness of each polyvalent cation in reducing different alkalinity concentrations is to use a set of factorial experiments. These were established and carried out. A statistical factorial experiment is one conducted to investigate the effect of two or more variable (factors) on the mean value of a response variable. Some of the key factorial and regression effectiveness studies performed in developing this patent application follow.

A four factor statistical analysis that involved the study of Calcium ($Ca^{+2}$), Magnesium ($Mg^{+2}$), Aluminum ($Al^{+3}$), and Alkalinity Index (Aidx) was carried out using about 1.05 specific gravity alumina red mud byproduct of 13 pH as well as an about 15% slurry of clay contaminated with fine iron filings and sodium and potassium hydroxide. The pH was also 13. The response variable was change in pH at 30, 60, 90 minutes and 24 hours. All salt was added in the dry form. An example of a Factorial Statistical Design used in the development of this technology is shown in Table 1.

TABLE 1

| Mg+2 | Ca+2 | Al+3 | Aidx | Mg*Ca | pH (30 min) |
|---|---|---|---|---|---|
| 0.296 | 0.54 | 0.119 | 31 | 0.16 | 8.5 |
| 0.197 | 0.36 | 0.238 | 37.5 | 0.071 | 8.3 |
| 0.099 | 0.18 | 0.12 | 44 | 0.0178 | 9.9 |
| 0.296 | 0.18 | 0.12 | 44 | 0.0533 | 8.55 |
| 0.099 | 0.54 | 0.12 | 44 | 0.054 | 9.5 |
| 0.099 | 0.54 | 0.357 | 31 | 0.054 | 6 |
| 0.197 | 0.36 | 0.238 | 37.5 | 0.071 | 8.2 |
| 0.099 | 0.18 | 0.357 | 44 | 0.0178 | 8.2 |
| 0.296 | 0.18 | 0.357 | 31 | 0.053 | 5.8 |
| 0.296 | 0.54 | 0.357 | 44 | 0.16 | 7.5 |
| 0.246 | 0.001 | 0.179 | 44 | 0.001 | 8.8 |
| 0.246 | 0.18 | 0.179 | 44 | 0.0443 | 8.7 |
| 0.296 | 0.36 | 0.001 | 44 | 0.001 | 9.6 |
| 0.247 | 0.36 | 0.119 | 37.5 | 0.0889 | 8.6 |
| 0.296 | 0.36 | 0.119 | 44 | 0.107 | 8.55 |
| 0.296 | 0.18 | 0.119 | 44 | 0.053 | 8.6 |
| 0.296 | 0.18 | 0.36 | 44 | 0.053 | 7.5 |
| 0.296 | 0.54 | 0.36 | 44 | 0.16 | 7.7 |
| 0.099 | 0.54 | 0.36 | 31 | 0.053 | 6 |
| 0.099 | 0.54 | 0.12 | 31 | 0.053 | 8.1 |
| 0.099 | 0.54 | 0.119 | 44 | 0.053 | 9.5 |
| 0.099 | 0.54 | 0.119 | 44 | 0.053 | 9.6 |
| X1 | X2 | X3 | X4 | X1*X2 | Y |

The resultant regression equation for the pH response is at 30 minutes of mixing: $6.74-5.27(Mg^{+2})-1.527(Ca^{+2})-7.55(Al^{+3})+0.104(Aidx)+8.28(Ca^{+2}*Mg^{+2})$. The equation Coefficient of Determination ($R^2$)=0.91; F-Ratio of 41.3 for model at a >99% confidence level. Multiple regression statistics are shown in Table 2.

TABLE 2

| Dependent | pH (30 min) response = Y, element analysis in grams | | | | | |
|---|---|---|---|---|---|---|
| Regression Equation Section | | | | | | |
| Independent Variable | Regression Coefficient | Standard Error | T-Value (Ho: B = 0) | Prob Level | Decision (5%) | Power (5%) |
| Intercept | 6.741584 | 0.8652696 | 7.7913 | 0.000001 | Reject Ho | 1.0000 |
| Mg | −5.272284 | 1.450637 | −3.6345 | 0.002231 | Reject Ho | 0.9263 |
| Ca | −1.522303 | 0.8352348 | −1.8226 | 0.087105 | Accept Ho | 0.4027 |
| Al | −7.550253 | 0.7624828 | −9.9022 | 0.000000 | Reject Ho | 1.0000 |
| Alkalinity Idx | 0.1041732 | 1.552946E−02 | 6.7081 | 0.000005 | Reject Ho | 0.9999 |
| Mg * Ca | 8.27896 | 3.304713 | 2.5052 | 0.023428 | Reject Ho | 0.6528 |
| R-Squared | 0.928028 | | | | | |
| Regression Coefficient Section | | | | | | |
| Independent Variable | Regression Coefficient | Standard Error | Lower 95% C.L. | Upper 95% C.L. | Standardized Coefficient | |
| Intercept | 6.741584 | 0.8652696 | 4.907294 | 8.575873 | 0.0000 | |
| Mg | −5.272284 | 1.450637 | −8.347496 | −2.197071 | −0.4096 | |
| Ca | −1.522303 | 0.8352348 | −3.292922 | 0.2483156 | −0.2312 | |
| Al | −7.550253 | 0.7624828 | −9.166644 | −5.933862 | −0.7580 | |
| Alkalinity Idx | 0.1041732 | 1.552946E−02 | 7.125223E−02 | 0.1370942 | 0.5002 | |
| Mg * Ca | 8.27896 | 3.304713 | 1.273282 | 15.28464 | 0.3276 | |
| T-Critical | 2.119905 | | | | | |

TABLE 2-continued

Analysis of Variance Section

| Source | DF | Sum of Squares | Mean Square | F-Ratio | Prob Level | Power (5%) |
|---|---|---|---|---|---|---|
| Intercept | 1 | 1500.677 | 1500.677 | | | |
| Model | 5 | 26.04807 | 5.209614 | 41.2620 | 0.000000 | 0.994345 |
| Error | 16 | 2.020112 | 0.126257 | | | |
| Total (Adjusted) | 21 | 28.06818 | 1.33658 | | | |

| | | | |
|---|---|---|---|
| Root Mean Square Error | 0.3553266 | R-Squared | 0.9280 |
| Mean of Dependent | 8.259091 | Adj R-Squared | 0.9055 |
| Coefficient of Variation | 4.302248E−02 | Press Value | 5.700381 |
| Sum|Press Residuals| | 8.140982 | Press R-Squared | 0.7969 |

This model is shown in Table 3, except it is expressed in pounds of the actual chemical molecules used per ton of waste treated.

TABLE 3

| | | | | | |
|---|---|---|---|---|---|
| 48 | 24 | 16 | 31 | 1152 | 8.5 |
| 32 | 16 | 32 | 37.5 | 512 | 8.3 |
| 16 | 8 | 16 | 44 | 128 | 9.9 |
| 48 | 8 | 16 | 44 | 384 | 8.55 |
| 16 | 24 | 16 | 44 | 384 | 9.5 |
| 16 | 24 | 48 | 31 | 384 | 6 |
| 16 | 16 | 32 | 37.5 | 256 | 8.2 |
| 16 | 8 | 48 | 44 | 128 | 8.2 |
| 48 | 8 | 48 | 31 | 384 | 5.8 |
| 48 | 24 | 48 | 44 | 1152 | 7.5 |
| 40 | 0.001 | 24 | 44 | 0.001 | 8.8 |
| 40 | 8 | 24 | 44 | 320 | 8.7 |
| 48 | 16 | 0.001 | 44 | 0.001 | 9.6 |
| 40 | 16 | 16 | 37.5 | 640 | 8.6 |
| 48 | 8 | 16 | 44 | 384 | 8.55 |
| 48 | 8 | 16 | 44 | 384 | 8.6 |
| 48 | 24 | 48 | 44 | 1152 | 7.5 |
| 48 | 24 | 48 | 44 | 1152 | 7.7 |
| 16 | 24 | 48 | 31 | 384 | 6 |
| 16 | 24 | 16 | 31 | 384 | 8.1 |
| 16 | 24 | 16 | 44 | 384 | 9.5 |
| 16 | 24 | 16 | 44 | 384 | 9.6 |
| Mg + 2 | Ca + 2 | Al + 3 | Aidx | Mg * Ca | pH (30 min) |
| X1 | X2 | X3 | X4 | X1 * X2 | Y |

This regression equation (in pounds) for the pH of the treated waste at 30 minutes is shown in Table 4.

TABLE 4

| Dependent | pH (30 min) = Y Pounds of MgSO4*7H20, CaCl2_anhy, Ammonium Alum per ton waste |
|---|---|

Regression Equation Section

| Independent Variable | Regression Coefficient | Standard Error | T-Value (Ho: B = 0) | Prob Level | Decision (5%) | Power (5%) |
|---|---|---|---|---|---|---|
| Intercept | 6.902774 | 0.74432 | 9.2739 | 0.000000 | Reject Ho | 1.000000 |
| Mg | −3.603484E−02 | 7.921394E−03 | −4.5491 | 0.000329 | Reject Ho | 0.989337 |
| Ca | −3.648528E−02 | 1.645241E−02 | −2.2176 | 0.041405 | Reject Ho | 0.549233 |
| Al | −6.017634E−02 | 5.367156E−03 | −11.2120 | 0.000000 | Reject Ho | 1.000000 |
| Alkalinity Idx | 0.1035826 | 1.349576E−02 | 7.6752 | 0.000001 | Reject Ho | 1.000000 |
| Mg * Ca | 1.368777E−03 | 4.189366E−04 | 3.2673 | 0.004842 | Reject Ho | 0.865627 |
| R-Squared | 0.944003 | | | | | |

Regression Coefficient Section

| Independent Variable | Regression Coefficient | Standard Error | Lower 95% C.L. | Upper 95% C.L. | Standardized Coefficient |
|---|---|---|---|---|---|
| Intercept | 6.902774 | 0.74432 | 5.324886 | 8.480661 | 0.0000 |
| Mg | −3.603484E−02 | 7.921394E−03 | −5.282744E−02 | −1.924223E−02 | −0.4699 |
| Ca | −3.648528E−02 | 1.645241E−02 | 7.136285E−02 | −1.607724E−03 | −0.2522 |
| Al | −6.017634E−02 | 5.367156E−03 | −0.0715542 | −4.879848E−02 | −0.8100 |
| Alkalinity Idx | 0.1035826 | 1.349576E−02 | 7.497291E−02 | 0.1321924 | 0.4974 |
| Mg * Ca | 1.368777E−03 | 4.189366E−04 | 4.806712E−04 | 2.256883E−03 | 0.4252 |
| T-Critical | 2.119905 | | | | |

TABLE 4-continued

Analysis of Variance Section

| Source | DF | Sum of Squares | Mean Square | F-Ratio | Prob Level | Power (5%) |
|---|---|---|---|---|---|---|
| Intercept | 1 | 1500.677 | 1500.677 | | | |
| Model | 5 | 26.49646 | 5.299292 | 53.9463 | 0.000000 | 0.999425 |
| Error | 16 | 1.571723 | 9.823267E−02 | | | |
| Total (Adjusted) | 21 | 28.06818 | 1.33658 | | | |

| | | | |
|---|---|---|---|
| Root Mean Square Error | 0.3134209 | R-Squared | 0.9440 |
| Mean of Dependent | 8.259091 | Adj R-Squared | 0.9265 |
| Coefficient of Variation | 0.0379486 | Press Value | 5.720131 |
| Sum\|Press Residuals\| | 7.59758 | Press R-Squared | 0.7962 |

The cation values shown in the test model in Table 1 are the total grams of each target active metal in each experiment. To convert the metal grams into the grams of actual salts used you must do the following mathematical conversions:

$Mg^{+2}$ came from magnesium sulfate.$7H_2O$. $Mg^{+2}$ is 9.85% by weight of this molecule.

Divide 0.30/0.0985=3 grams. $Ca^{+2}$ came from Calcium Chloride. $Ca^{+2}$ is 36% by weight of this molecule. Divide 0.54/0.36=1.5 grams. $Al^{+3}$ came from ammonium aluminum sulfate.$18H_2O$. $Al^{+3}$ is 11.9% by weight of this molecule. Divide 0.36/0.119=3.0 grams.

Each value is converted in this manner. Note that each experiment was based on 125 grams of raw Aidx 31 to 44 waste/by-products. Use this as a basis to calculate how many pounds of salt per ton of waste would be required.

The waste/by-product Aidx factor (Alkalinity Index factor value) shown in the study designs referenced above was determined as follows. Because high alkalinity/high pH wastes can contain complex buffering solids such as in the case of the alumina red mud, a direct acid neutralization method was chosen to determine an alkalinity index that could be used in the factorial design test scheme. Both waste materials in this study were titrated with a 1 normal (1 N) solution of hydrochloric acid from the raw pH of about.13 to 6.0 pH. A curve and an equation describing each of the two curves were generated. Next, each curve was integrated from pH 6 to 13. The resulting y/dx area value was used as the Aidx. In the case of red mud this integration value was 44, and the lower alkalinity waste, which was less complex, had an Aidx integration value of 31. These Aidx values allowed the generation of a regression response equation that included not only the impact of each polyvalent cation in various salts but how these impacts would change as the strength of an alkaline waste varied. Graphs of these waste neutralization curves with their representative regression equations and integral areas under each curve between pHs 6-13 are included here. Area under the curve is integrated to yield the Aidx value to use in treatment regression equations for individual treatment formulae and base normalities of various red muds (spent bauxites).

Figure 2:
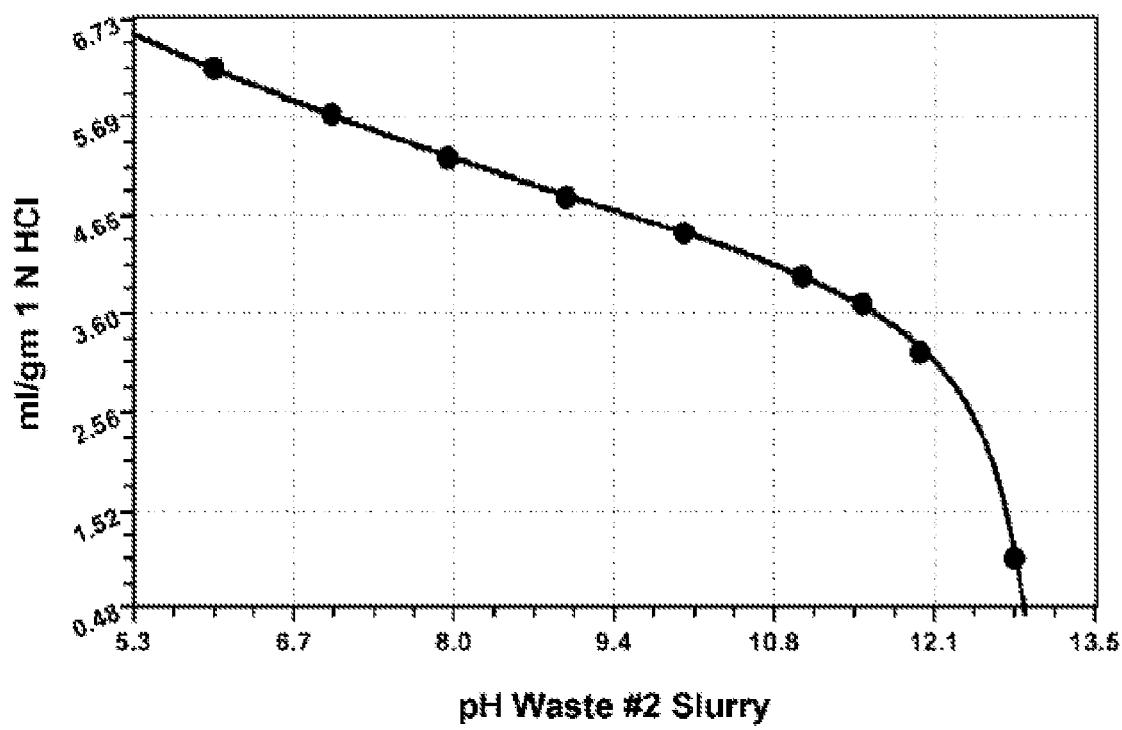

A graph of red mud neutralization is shown in FIG. 1. Regression equation and integral areas under the curve between pH 6-13 for FIG. 1 are:
Y=mL 1N HCl/g of waste;
X=pH of red mud caustic slurry
$Y=89.8-26.06X+2.96X^2-0.1087X^3$
Standard Error=0.43 pH units
regression coefficient (r)=0.998
Integral of range 6 pH to 13=l(ydx)=44 area A graph of lower alkalinity waste neutralization is shown in FIG. 2. Regression equation and integral areas under the curve between pH 6-13 for FIG. 2 are:
Y=mL 1N HCL/g of waste;
X=pH of Waste #2 caustic slurry
$Y=(12.25-0.95X)/(1+0.0798X-0.0118X^2)$
Standard Error=0.66 pH units
regression coefficient (r)=0.987
Integral of pH range 6−13=l(ydx)=31 area.

A three factor statistical analysis was run that involved the study of Calcium ($Ca^{+2}$), Magnesium ($Mg^{+2}$) and temperature (° F.) of the waste/salt mix. The response variable was change in pH at 15, 30, 60, 90 minutes and 24 hours. All salt was added in the dry form and each test sample comprised 125 grams of raw Aidx 44 waste/by-product. This study design is shown in Table 5. Table 5 lists $MgSO_4.7H_2O$ ("A Epsom gms" in the table) and anhydrous $CaCl_2$ ("$CaCl_2$_Anh gms" in the table) in grams of the salt, not quantity of cation.

TABLE 5

| Std | Dsn Id | Run | Block | A Epsom gms Factor | CaCl2_Anh gms Factor | C. Temp F. Factor | pH15 su Response | 30-250 g smple su Response | pH45 su Response | pH60 su Response |
|---|---|---|---|---|---|---|---|---|---|---|
| 7 | 7 | 1 | 1 | 1.50 | 2.00 | 110.00 | | 11.55 | | |
| 6 | 6 | 2 | 1 | 5.50 | 0.80 | 110.00 | | 9.60 | | |
| 10 | 0 | 3 | 1 | 3.50 | 1.40 | 85.00 | | 10.80 | | |
| 5 | 5 | 4 | 1 | 1.50 | 0.80 | 110.00 | | 12.68 | | |
| 8 | 8 | 5 | 1 | 5.50 | 2.00 | 60.00 | | 9.50 | | |
| 9 | 0 | 6 | 1 | 3.50 | 1.40 | 85.00 | | 10.70 | | |
| 4 | 4 | 7 | 1 | 5.50 | 2.00 | 60.00 | | 9.50 | | |
| 2 | 2 | 8 | 1 | 5.50 | 0.80 | 60.00 | | 9.60 | | |
| 1 | 1 | 9 | 1 | 1.50 | 0.80 | 60.00 | | 12.70 | | |
| 3 | 3 | 10 | 1 | 1.50 | 2.00 | 60.00 | | 11.60 | | |

A regression equation describing the relationship of the independent variables and the dependent variable waste pH at 30 minutes of mixing is found in Table 6.

TABLE 6

Mg (Epsom Salt), CaCl2-Anhy, Temp F.
250 gram red mud sample treated

Dependent pH (30 min) = Y; 250 Gram Samples of Aidx 44 Red Mud; Treatment Equation based on Total Chemical Additions (not on element weights)

Regression Equation Section

| Independent Variable | Regression Coefficient | Standard Error | T-Value (Ho: B = 0) | Prob Level | Decision (5%) | Power (5%) |
|---|---|---|---|---|---|---|
| Intercept | 14.1841 | 0.5545943 | 25.5756 | 0.000000 | Reject Ho | 1.000000 |
| Mg_ES | −0.6572538 | 5.173846E−02 | −12.7034 | 0.000015 | Reject Ho | 1.000000 |
| CaCl2_anhy | −0.5450127 | 0.1724615 | −3.1602 | 0.019560 | Reject Ho | 0.749860 |
| Temp F. | −3.721212E−03 | 4.393587E−03 | −0.8470 | 0.429497 | Accept Ho | 0.111025 |
| R-Squared | 0.967302 | | | | | |

Regression Coefficient Section

| Independent Variable | Regression Coefficient | Standard Error | Lower 95% C.L. | Upper 95% C.L. | Standardized Coefficient |
|---|---|---|---|---|---|
| Intercept | 14.1841 | 0.5545943 | 12.82706 | 15.54115 | 0.0000 |
| Mg_ES | −0.6572538 | 5.173846E−02 | −0.7838532 | −0.5306544 | −0.9727 |
| CaCl2_anhy | −0.5450127 | 0.1724615 | −0.9670108 | −0.1230145 | −0.2420 |
| Temp F. | −3.721212E−03 | 4.393587E−03 | −1.447193E−02 | 7.02951E−03 | −0.0671 |
| T-Critical | 2.446912 | | | | |

Analysis of Variance Section

| Source | DF | Sum of Squares | Mean Square | F-Ratio | Prob Level | Power (5%) |
|---|---|---|---|---|---|---|
| Intercept | 1 | 1171.373 | 1171.373 | | | |
| Model | 3 | 14.13385 | 4.711282 | 59.1666 | 0.000076 | 0.997085 |
| Error | 6 | 0.4777644 | 0.0796274 | | | |
| Total (Adjusted) | 9 | 14.61161 | 1.623512 | | | |

| | | | |
|---|---|---|---|
| Root Mean Square Error | 0.2821833 | R-Squared | 0.9673 |
| Mean of Dependent | 10.823 | Adj R-Squared | 0.9510 |
| Coefficient of Variation | 2.607256E−02 | Press Value | 1.578493 |
| Sum|Press Residuals| | 3.573037 | Press R-Squared | 0.8920 |

For Table 6, the regression equation is: pH @ 30 min. treatment=14.18−0.657(Mg_ES)−0.545($CaCl_2$)−0.0037 (Mixture temp, ° F.); the $R^2$ value for the equation is 0.95 and the model F-ratio of 59.1 at >99% confidence. The Mg_ES ingredient is magnesium sulfate.$7H_2O$, the $CaCl_2$_anhy is industrial grade anhydrous $CaCl_2$, and the Temp F represents the temperature in ° F. of the raw waste treated.

A four factor statistical analysis that involved the study of Calcium ($Ca^{+2}$) in two forms [calcium chloride and calcium sulfate.$2H_2O$], Magnesium ($Mg^{+2}$), and Sodium Chloride ($Na^+$), the latter to determine if it interfered with the neutralization reactions of the calcium and magnesium. The calcium sulfate, which fails the solubility criteria, was examined to see if there was any positive or negative impact on pH reduction. The response variable was change in pH at 5, 10, 15, 20, and 30 minutes plus 24 hours. All salt was added in the dry form. The test model is shown in Table 7.

TABLE 7

Red Mud Neutralization Tests (addition in grams)

| RM | NaCl | CaCl2 | Gypsum | Epsom | pH/5 | pH/10 | pH/15 | pH/20 | pH/30 | pH/60 | pH/24 h |
|---|---|---|---|---|---|---|---|---|---|---|---|
| 256.88 | .2 | 1 | .2 | 2 | 12.1 | 12.1 | 12.1 | 12.1 | 12.14 | 12.18 | 11.2 |
| 256.88 | .2 | 3 | .8 | 2 | 11.13 | 10.9 | 10.92 | 10.92 | 11.0 | 11.06 | 10.47 |
| 256.88 | .8 | 1 | .2 | 6 | 9.62 | 9.61 | 9.61 | 9.62 | 9.62 | 9.62 | 9.4 |
| 250 | .2 | 3 | .2 | 6 | 9.24 | 9.24 | 9.17 | 9.17 | 9.17 | 9.14 | 9.3 |
| 250 | .8 | 1 | .8 | 2 | 10.93 | 10.9 | 10.87 | 10.87 | 10.86 | 10.86 | 10.92 |
| 250 | .5 | 2 | .5 | 4 | 10.04 | 10.04 | 10.05 | 10.06 | 10.06 | 10.09 | 10.18 |
| 250 | .8 | 3 | .8 | 6 | 9.3 | 9.3 | 9.31 | 9.3 | 9.25 | 9.28 | 9.44 |
| 250 | .2 | 1 | .8 | 6 | 9.23 | 9.21 | 9.22 | 9.2 | 9.19 | 9.18 | 9.29 |

TABLE 7-continued

Red Mud Neutralization Tests (addition in grams)

| RM | NaCl | CaCl2 | Gypsum | Epsom | pH/5 | pH/10 | pH/15 | pH/20 | pH/30 | pH/60 | pH/24 h |
|---|---|---|---|---|---|---|---|---|---|---|---|
| 250 | .8 | 3 | .2 | 2 | 10.57 | 10.43 | 10.43 | 10.51 | 10.51 | 10.56 | 10.74 |
| 250 |  | 2 |  | 6 | 9.3 | 9.3 | 9.28 | 9.28 | 9.26 | 9.3 | 9.47 |

Notes:
At random choose Test#1, Test#4, Test#8, Test#10 to re-test pH of the 5 min, 15 min, and 30 min samples of each test 1 hour later, and found no significant change in pH from the from the first 5 minutes, which proves the chemical reaction is immediate with good mixing.
The pH of the untreated Red Mud was a pH 12.55 and tests were conducted at room temperature. The temperature of the red mud was 65.9 F..
Salinity will be checked on any free water and on settled red mud on all samples when calibration solution for salinity meter arrives. Will also check pH.
[Kaiser Red Mud with SG of ~1.025 compared to PNB shipped buckets at ~1.05; all test samples were 250 grams of Red Mud plus chemical additions.f]

The regression equation that describes the mean pH value of all measurements from 5 through 60 minutes as impacted by the salts is shown in Table 8. The factorial design for this work used the total weight of each salt, and not the key element's ($Ca^{+2}$, $Mg^{+2}$, $Na^{+1}$) weight. Each test sample comprised 250 grams of an Aidx 44 waste/by-product.

TABLE 8

Analysis of Mean pH 60 mn total @ 5 minute Intervals - Treated Bauxite Red Mud

| SOURCE | SUM OF SQUARES | DF | MEAN SQUARE | F VALUE | PROB > F |
|---|---|---|---|---|---|
| MODEL | 7.64345 | 5 | 1.52869 | 9.32 | 0.0997 |
| CURVATURE | 0.01027 | 1 | 0.01027 | 0.06 | 0.8258 |
| RESIDUAL | 0.32810 | 2 | 0.16405 |  |  |
| COR TOTAL | 7.98182 | 8 |  |  |  |
| ROOT MSE | 0.40503 |  | R-SQUARED | 0.96 |  |
| DEP MEAN | 10.15556 |  | ADJ R-SQUARED | 0.86 |  |
| C.V. % | 3.98827 |  |  |  |  |

Case(s) with leverage of 1.0000: PRESS statistic not defined.

| FACTOR | COEFFICIENT ESTIMATE | DF | STANDARD ERROR | t FOR H0 COEFFICIENT = 0 | PROB > \|t\| |
|---|---|---|---|---|---|
| INTERCEPT | 10.167500 | 1 | 0.143200 |  |  |
| A | −0.207500 | 1 | 0.143200 | −1.45 | 0.2843 |
| B | −0.287500 | 1 | 0.143200 | −2.01 | 0.1825 |
| C | −0.077500 | 1 | 0.143200 | −0.54 | 0.6426 |
| D | −0.842500 | 1 | 0.143200 | −5.88 | 0.0277 |
| AD | 0.337500 | 1 | 0.143200 | 2.36 | 0.1425 |
| CENTER POINT | −0.107500 | 1 | 0.429600 | −0.25 | 0.8258 |

Final Equation in Terms of Coded Factors

Mean pH 60 mn = 10.16750 −
0.20750 * A −
0.28750 * B −
0.07750 * C −
0.84250 * D +
0.33750 * A * D Final Equation in Terms of Uncoded Factors Mean pH 60 mn = 14.02750 −
2.94167 * NaCl −
0.28750 * CaCl2 −
0.25833 * Gypsum −
0.70250 * Epsom Salt +
0.56250 * NaCl * Epsom Salt

| OBS ORD | ACTUAL VALUE | PREDICTED VALUE | RESIDUAL | LEVER | STUDENT RESID | COOK'S DIST | OUTLIER T VALUE | RUN ORD |
|---|---|---|---|---|---|---|---|---|
| 1 | 12.12 | 11.92 | 0.200 | 0.750 | 0.988 | 0.418 | 0.976 | 6 |
| 2 | 9.62 | 9.82 | −0.200 | 0.750 | −0.988 | 0.418 | −0.976 | 3 |
| 3 | 9.19 | 8.99 | 0.205 | 0.750 | 1.012 | 0.439 | 1.025 | 8 |
| 4 | 10.05 | 10.26 | −0.205 | 0.750 | −1.012 | 0.439 | −1.025 | 2 |
| 5 | 9.20 | 9.41 | −0.205 | 0.750 | −1.012 | 0.439 | −1.025 | 9 |
| 6 | 10.88 | 10.68 | 0.205 | 0.750 | 1.012 | 0.439 | 1.025 | 5 |
| 7 | 10.99 | 11.19 | −0.200 | 0.750 | −0.988 | 0.418 | −0.976 | 7 |
| 8 | 9.29 | 9.09 | 0.200 | 0.750 | 0.988 | 0.418 | 0.976 | 4 |
| 9 | 10.06 | 10.06 | −0.000 | 1.000 | 0.000 | 0.000 | 0.000 | 1 |

The mean pH values for each test from the model shown in Table 7 are shown in Table 9.

Also shown in Table 9 are the standard deviation in the pH values over the 60 minute test period, as well as the difference between the mean 60 minute pH value and the pH after 24 hours.

TABLE 9

| | | |
|---|---|---|
| 12.12 | 0.033 | −0.92 |
| 10.99 | 0.092 | −0.52 |
| 9.62 | 0.0052 | −0.22 |
| 9.19 | 0.042 | 0.11 |
| 10.88 | 0.028 | 0.04 |
| 10.06 | 0.019 | 0.12 |
| 9.29 | 0.022 | 0.15 |
| 9.2 | 0.019 | 0.09 |
| 10.5 | 0.061 | 0.2 |

TABLE 9-continued

| | | |
|---|---|---|
| 9.9 | 0.016 | 0.18 |
| X1 | X2 | X3 |

X1 = Mean value of all pH measurements in the NaCl, CaCl2, CaSO4*2H2O and MgSO4*7H2O study starting with 5 minutes at 5 minute intervals to 60 minutes.
X2 = Standard deviation of all mean values of X1
X3 = Difference in the pH at 24 hours for each experiment and the 60 summary mean of X1 column.

This study was carried out to determine the impact of a single valent salt, NaCl, on a mix of active salts ($CaCl_2$, $MgSO_4.7H_2O$) and to determine if the essentially insoluble $CaSO_4.2H_2O$ (gypsum) would positively impact the reduction of alkalinity/pH in the treated waste.

The regression equation explaining the impact of these independent variables on the standard deviation of the pH value of measurements at 5 minute intervals from 5 minutes to 60 minutes is:
2.36+0.97*(NaCl)+1.76*($CaCl_2$)+4.7*($CaSO_4.2H_2O$)−0.73*($MgSO_4.H_2O$)−8.5*(NaCl)* ($CaSO_4.2H_2O$); the $R^2$ value for the model is 0.95 with an F Ratio of 26.24 at a confidence of 94%, as shown in Table 10.

TABLE 10

Analysis of Stnd Dev Summary of pH's at 5 minute intervals to 60 mins.

| SOURCE | SUM OF SQUARES | DF | MEAN SQUARE | F VALUE | PROB > F |
|---|---|---|---|---|---|
| MODEL | 54.42300 | 5 | 10.8846 | 26.24 | 0.0371 |
| CURVATURE | 2.76909 | 1 | 2.7691 | 6.68 | 0.1228 |
| RESIDUAL | 0.82960 | 2 | 0.4148 | | |
| COR TOTAL | 58.02169 | 8 | | | |
| ROOT MSE | 0.64405 | | R-SQUARED | 0.98 | |
| DEP MEAN | 3.46889 | | ADJ R-SQUARED | 0.95 | |
| C.V. % | 18.56645 | | | | |

Case(s) with leverage of 1.0000: PRESS statistic not defined.

| FACTOR | COEFFICIENT ESTIMATE | DF | STANDARD ERROR | t FOR H0 COEFFICIENT = 0 | PROB > \|t\| |
|---|---|---|---|---|---|
| INTERCEPT | 3.665000 | 1 | 0.227706 | | |
| A | −0.985000 | 1 | 0.227706 | −4.33 | 0.0495 |
| B | 1.760000 | 1 | 0.227706 | 7.73 | 0.0163 |
| C | 0.135000 | 1 | 0.227706 | 0.59 | 0.6134 |
| D | −1.460000 | 1 | 0.227706 | −6.41 | 0.0235 |
| AC | −0.765000 | 1 | 0.227706 | −3.36 | 0.0783 |
| CENTER POINT | −1.765000 | 1 | 0.683118 | −2.58 | 0.1228 |

Final Equation in Terms of Coded Factors

Stnd Dev 60 m = 3.66500 −
0.98500 * A +
1.76000 * B +
0.13500 * C −
1.46000 * D −
0.76500 * A * C Final Equation in Terms of Uncoded Factors Stnd Dev 60 m = 2.35667 +
0.96667 * NaCl +
1.76000 * CaCl2 +
4.70000 * Gypsum −
0.73000 * Epsom Salt −
8.50000 * NaCl * Gypsum

| OBS ORD | ACTUAL VALUE | PREDICTED VALUE | RESIDUAL | LEVER | STUDENT RESID | COOK'S DIST | OUTLIER T VALUE | RUN ORD |
|---|---|---|---|---|---|---|---|---|
| 1 | 3.30 | 3.45 | −0.150 | 0.750 | −0.466 | 0.093 | −0.349 | 6 |
| 2 | 0.52 | 0.09 | 0.430 | 0.750 | 1.335 | 0.764 | 2.867 | 3 |
| 3 | 4.20 | 4.05 | 0.150 | 0.750 | 0.466 | 0.093 | 0.349 | 8 |
| 4 | 6.10 | 6.53 | −0.430 | 0.750 | −1.335 | 0.764 | −2.867 | 2 |
| 5 | 1.90 | 2.33 | −0.430 | 0.750 | −1.335 | 0.764 | −2.867 | 9 |
| 6 | 1.90 | 1.75 | 0.150 | 0.750 | 0.466 | 0.093 | 0.349 | 5 |
| 7 | 9.20 | 8.77 | 0.430 | 0.750 | 1.335 | 0.764 | 2.867 | 7 |

TABLE 10-continued

Analysis of Stnd Dev Summary of pH's at 5 minute intervals to 60 mins.

| 8 | 2.20 | 2.35 | −0.150 | 0.750 | −0.466 | 0.093 | −0.349 | 4 |
| 9 | 1.90 | 1.90 | 0.000 | 1.000 | 0.000 | 0.000 | 0.000 | 1 |

The regression equation that describes the impact on the difference in mean pH for each test protocol over 60 minutes and at 24 hours is shown in Table 11.

TABLE 11

Analysis of pH 24 H-60u: Difference in Summary 60 min. mean pH and pH at 24 Hrs. Bauxite red mud test sample, 250 gram raw sample size.

| SOURCE | SUM OF SQUARES | DF | MEAN SQUARE | F VALUE | PROB > F |
|---|---|---|---|---|---|
| MODEL | 1.12616 | 5 | 0.22523 | 54.11 | 0.0182 |
| CURVATURE | 0.05500 | 1 | 0.05500 | 13.21 | 0.0680 |
| RESIDUAL | 0.00833 | 2 | 0.00416 | | |
| COR TOTAL | 1.18949 | 8 | | | |
| ROOT MSE | 0.06452 | | R-SQUARED | 0.99 | |
| DEP MEAN | −0.10111 | | ADJ R-SQUARED | 0.97 | |
| C.V. % | −63.80846 | | | | |

Case(s) with leverage of 1.0000: PRESS statistic not defined.

| FACTOR | COEFFICIENT ESTIMATE | DF | STANDARD ERROR | t FOR H0 COEFFICIENT = 0 | PROB > |t| |
|---|---|---|---|---|---|
| INTERCEPT | −0.128750 | 1 | 0.022810 | | |
| A | 0.181250 | 1 | 0.022810 | 7.95 | 0.0155 |
| B | 0.123750 | 1 | 0.022810 | 5.43 | 0.0323 |
| C | 0.068750 | 1 | 0.022810 | 3.01 | 0.0947 |
| D | 0.161250 | 1 | 0.022810 | 7.07 | 0.0194 |
| AD | −0.248750 | 1 | 0.022810 | −10.91 | 0.0083 |
| CENTER POINT | 0.248750 | 1 | 0.068431 | 3.64 | 0.0680 |

Final Equation in Terms of Coded Factors $$\text{pH 24 H-60u} = -0.12875 + 0.18125 * A + 0.12375 * B + 0.06875 * C + 0.16125 * D - 0.24875 * A * D$$

Final Equation in Terms of Uncoded Factors $$\text{pH 24 H-60u} = -1.94458 + 2.26250 * NaCl + 0.12375 * CaCl2 + 0.22917 * Gypsum + 0.28792 * Epsom\ Salt - 0.41458 * NaCl * Epsom\ Salt$$

| OBS ORD | ACTUAL VALUE | PREDICTED VALUE | RESIDUAL | LEVER | STUDENT RESID | COOK'S DIST | OUTLIER T VALUE | RUN ORD |
|---|---|---|---|---|---|---|---|---|
| 1 | −0.92 | −0.91 | −0.008 | 0.750 | −0.232 | 0.023 | −0.167 | 6 |
| 2 | −0.22 | −0.23 | 0.007 | 0.750 | 0.232 | 0.023 | 0.167 | 3 |
| 3 | 0.11 | 0.15 | −0.045 | 0.750 | −1.395 | 0.834 | −6.000 | 8 |
| 4 | 0.24 | 0.19 | 0.045 | 0.750 | 1.395 | 0.834 | 6.000 | 2 |
| 5 | 0.09 | 0.04 | 0.045 | 0.750 | 1.395 | 0.834 | 6.000 | 9 |
| 6 | 0.04 | 0.08 | −0.045 | 0.750 | −1.395 | 0.834 | −6.000 | 5 |
| 7 | −0.52 | −0.53 | 0.007 | 0.750 | 0.232 | 0.023 | 0.167 | 7 |
| 8 | 0.15 | 0.16 | −0.008 | 0.750 | −0.232 | 0.023 | −0.167 | 4 |
| 9 | 0.12 | 0.12 | 0.000 | 1.000 | 0.000 | 0.000 | 0.000 | 1 |

The regression equation that describes the impact on salinity differences, measured in parts per million, on the treated sample decant water after 24 hours of standing, is shown in Table 12. The untreated test sample material (about a 40 A idx red mud) had a free mud separated water salinity of 14,600 ppm.

TABLE 12

Analysis of Salinity-Decant Water @24 hours of room temperature reaction time
NaCl, CaCl2, CaSO4*2H20 and MgSO4*7H20, ppm

| SOURCE | SUM OF SQUARES | DF | MEAN SQUARE | F VALUE | PROB > F |
|---|---|---|---|---|---|
| MODEL | 47186250.00 | 5 | 9437250.0 | 33.55 | 0.0292 |
| CURVATURE | 40138.89 | 1 | 40138.9 | 0.14 | 0.7419 |
| RESIDUAL | 562500.00 | 2 | 281250.0 | | |
| COR TOTAL | 47788888.89 | 8 | | | |
| ROOT MSE | 530.33 | | R-SQUARED | 0.99 | |
| DEP MEAN | 14988.89 | ADJ | R-SQUARED | 0.96 | |
| C.V. % | 3.54 | | | | |

Case(s) with leverage of 1.0000: PRESS statistic not defined.

| FACTOR | COEFFICIENT ESTIMATE | DF | STANDARD ERROR | t FOR H0 COEFFICIENT = 0 | PROB > |t| |
|---|---|---|---|---|---|
| INTERCEPT | 15012.5000 | 1 | 187.5000 | | |
| A | 1262.5000 | 1 | 187.5000 | 6.73 | 0.0214 |
| B | 1987.5000 | 1 | 187.5000 | 10.60 | 0.0088 |
| C | −162.5000 | 1 | 187.5000 | −0.87 | 0.4775 |
| D | 462.5000 | 1 | 187.5000 | 2.47 | 0.1325 |
| AD | −337.5000 | 1 | 187.5000 | −1.80 | 0.2137 |
| CENTER POINT | −212.5000 | 1 | 562.5000 | −0.38 | 0.7419 |

Final Equation in Terms of Coded Factors

Salinity-Decant = 15012.50 +
1262.50 * A +
1987.50 * B −
162.50 * C +
462.50 * D −
337.50 * A * D Final Equation in Terms of Uncoded Factors Salinity-Decant = 7154.17 +
6458.33 * NaCl +
1987.50 * CaCl2 −
541.67 * Gypsum +
512.50 * Epsom Salt −
562.50 * NaCl * Epsom Salt

| OBS ORD | ACTUAL VALUE | PREDICTED VALUE | RESIDUAL | LEVER | STUDENT RESID | COOK'S DIST | OUTLIER T VALUE | RUN ORD |
|---|---|---|---|---|---|---|---|---|
| 1 | 1.15E+04 | 1.11E+04 | 3.75E+02 | 0.750 | 1.414 | 0.857 | 0.000 | 6 |
| 2 | 1.42E+04 | 1.46E+04 | −3.75E+02 | 0.750 | −1.414 | 0.857 | 0.000 | 3 |
| 3 | 1.67E+04 | 1.67E+04 | 1.13E−13 | 0.750 | 0.000 | 0.000 | 0.000 | 8 |
| 4 | 1.83E+04 | 1.83E+04 | −1.03E−15 | 0.750 | −0.000 | 0.000 | −0.000 | 2 |
| 5 | 1.24E+04 | 1.24E+04 | −3.42E−13 | 0.750 | −0.000 | 0.000 | −0.000 | 9 |
| 6 | 1.40E+04 | 1.40E+04 | −1.03E−15 | 0.750 | −0.000 | 0.000 | −0.000 | 5 |
| 7 | 1.44E+04 | 1.48E+04 | −3.75E+02 | 0.750 | −1.414 | 0.857 | 0.000 | 7 |
| 8 | 1.86E+04 | 1.82E+04 | 3.75E+02 | 0.750 | 1.414 | 0.857 | 0.000 | 4 |
| 9 | 1.48E+04 | 1.48E+04 | 2.07E−13 | 1.000 | 0.000 | 0.000 | 0.000 | 1 |

A two factor statistical analysis that involved the study of $Mg^{+2}$ and $Al^{+3}$ with the response variable being the waste pH at 30 minutes. An example factorial test model for this pair of elements is shown in Table 13.

TABLE 13

| Std | Dsn Id | Run | Block | Al + 3 gms/ 125 gms Factor | Mg + 2 gms/ 125 gms Factor | pH (30 mn) su Response |
|---|---|---|---|---|---|---|
| 6 | 3 | 1 | 1 | 0.001 | 0.394 | 10.100 |
| 3 | 2 | 2 | 1 | 0.476 | 0.001 | 7.500 |
| 7 | 4 | 3 | 1 | 0.476 | 0.394 | 7.050 |
| 5 | 3 | 4 | 1 | 0.001 | 0.394 | 10.000 |
| 4 | 2 | 5 | 1 | 0.476 | 0.001 | 7.400 |

TABLE 13-continued

| Std | Dsn Id | Run | Block | Al + 3 gms/ 125 gms Factor | Mg + 2 gms/ 125 gms Factor | pH (30 mn) su Response |
|---|---|---|---|---|---|---|
| 9 | 0 | 6 | 1 | 0.238 | 0.195 | 8.900 |
| 2 | 1 | 7 | 1 | 0.001 | 0.001 | 12.900 |
| 10 | 0 | 8 | 1 | 0.238 | 0.195 | 9.000 |
| 8 | 4 | 9 | 1 | 0.476 | 0.394 | 7.200 |
| 1 | 1 | 10 | 1 | 0.001 | 0.001 | 13.000 |

The regression equation and detail that describes these relationships is found in Table 14. The weight of each element ion grams is used in this study and each test sample was comprised of 125 grams of an Aidx 44 waste/by-product.

TABLE 14

Analysis of pH @ 30 min. mixing - Al + 3 and Mg + 2 Study - 125 gm. Aidx 44 □ Red Mud waste samples□

| SOURCE | SUM OF SQUARES | DF | MEAN SQUARE | F VALUE | PROB > F |
|---|---|---|---|---|---|
| MODEL | 43.99121 | 3 | 14.6637 | 243.69 | <0.0001 |
| RESIDUAL | 0.36104 | 6 | 0.0602 | | |
| *LACK OF FIT | 0.32979 | 1 | 0.3298 | 52.77 | 0.0008 |
| *PURE ERROR | 0.03125 | 5 | 0.0062 | | |
| COR TOTAL | 44.35225 | 9 | | | |
| ROOT MSE | 0.24530 | | R-SQUARED | 0.99 | |
| DEP MEAN | 9.30500 | ADJ | R-SQUARED | 0.99 | |
| C.V. % | 2.63623 | PRED | R-SQUARED | 0.98 | |

Predicted Residual Sum of Squares (PRESS) = 0.6665
*Residual = Lack-Of-Fit + Pure Error

| FACTOR | COEFFICIENT ESTIMATE | DF | STANDARD ERROR | t FOR H0 COEFFICIENT = 0 | PROB > |t| |
|---|---|---|---|---|---|
| INTERCEPT | 9.302951 | 1 | 0.077571 | | |
| A | −2.106250 | 1 | 0.086727 | −24.29 | <0.0001 |
| B | −0.805095 | 1 | 0.086726 | −9.28 | <0.0001 |
| AB | 0.643750 | 1 | 0.086727 | 7.42 | 0.0003 |

Final Equation in Terms of Coded Factors pH (30 mn) = 9.30295 −
2.10625 * A −
0.80509 * B +
0.64375 * A * B Final Equation in Terms of Uncoded Factors pH (30 mn) = 12.87701 −
11.59274 * Al + 3 −
7.38705 * Mg + 2 +
13.79403 * Al + 3 * Mg + 2

| OBS ORD | ACTUAL VALUE | PREDICTED VALUE | RESIDUAL | LEVER | STUDENT RESID | COOK'S DIST | OUTLIER T VALUE | RUN ORD |
|---|---|---|---|---|---|---|---|---|
| 1 | 13.00 | 12.86 | 0.142 | 0.474 | 0.798 | 0.144 | 0.771 | 10 |
| 2 | 12.90 | 12.86 | 0.042 | 0.474 | 0.236 | 0.013 | 0.216 | 7 |
| 3 | 7.50 | 7.36 | 0.142 | 0.474 | 0.798 | 0.144 | 0.771 | 2 |
| 4 | 7.40 | 7.36 | 0.042 | 0.474 | 0.236 | 0.013 | 0.216 | 5 |
| 5 | 10.00 | 9.96 | 0.040 | 0.476 | 0.223 | 0.011 | 0.205 | 4 |
| 6 | 10.10 | 9.96 | 0.140 | 0.476 | 0.786 | 0.140 | 0.758 | 1 |
| 7 | 7.05 | 7.04 | 0.015 | 0.476 | 0.082 | 0.002 | 0.075 | 3 |
| 8 | 7.20 | 7.04 | 0.165 | 0.476 | 0.927 | 0.195 | 0.914 | 9 |
| 9 | 8.90 | 9.31 | −0.413 | 0.100 | −1.776 | 0.088 | −2.353 | 6 |
| 10 | 9.00 | 9.31 | −0.313 | 0.100 | −1.346 | 0.050 | −1.470 | 8 | pH @ 30 minute mixing=$12.88-11.59*(Al^{+3})-7.39*(Mg^{+2})+13.8(Al^{+3}*Mg^{+2})$; $R^2$ for this equation is 0.99 with an F value for the model of 243 at >99% confidence.

A single variable study was carried out on the elements $Al^{+3}$, $Ca^{+2}$, and $Mg^{+2}$ individually to check their impact on the pH of raw test samples comprising an Aidx 44 alumina by-product red mud 17-20% solids slurry.

Figure 3:
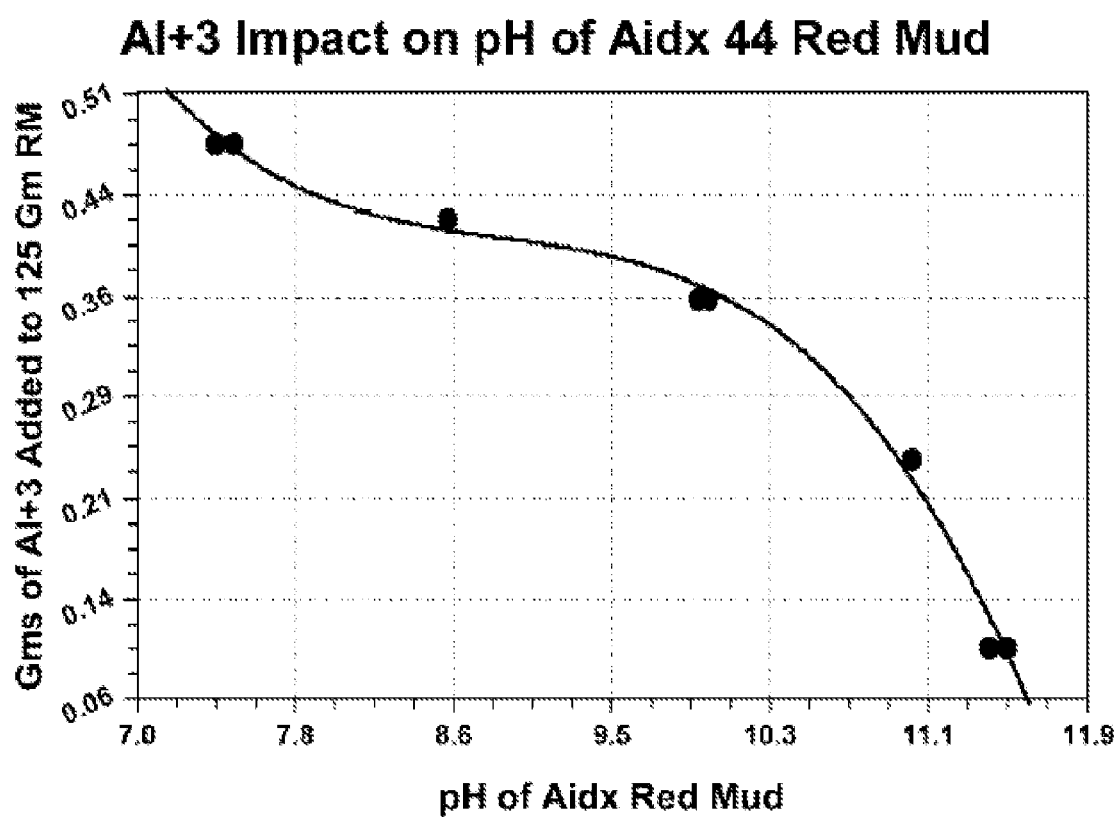
Figure 4:
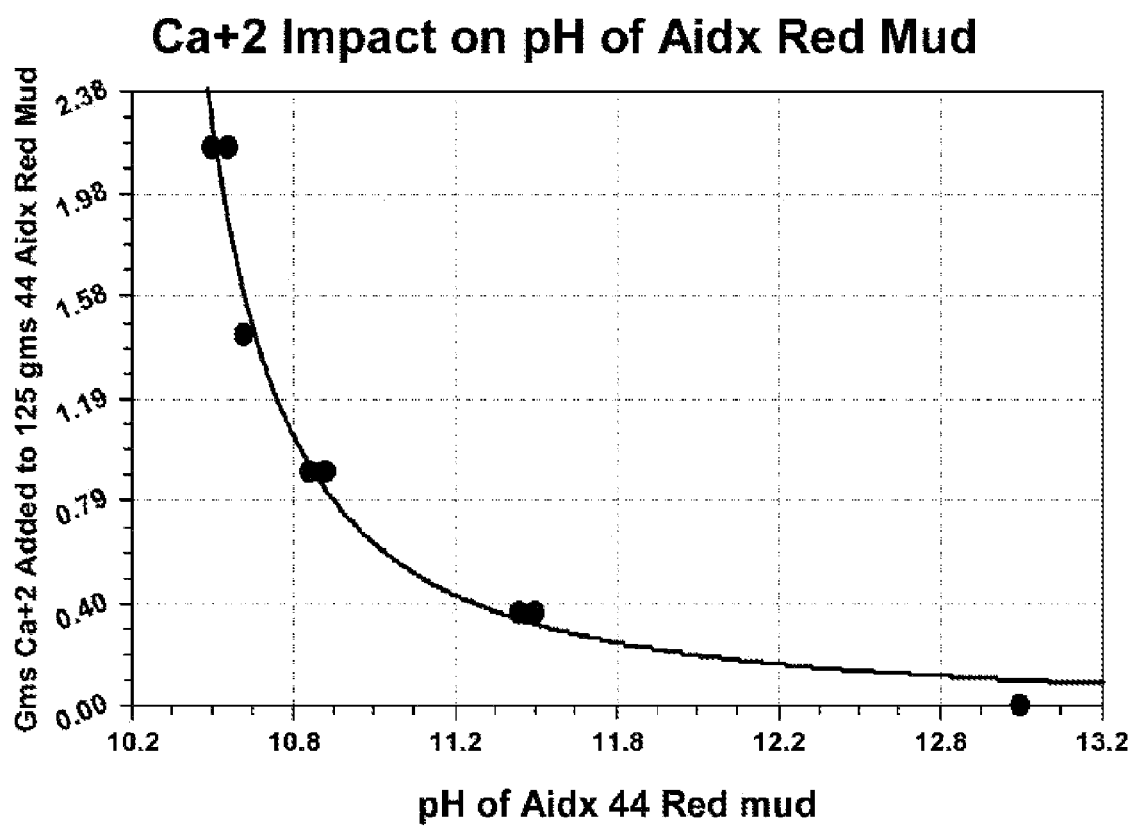
Figure 5:
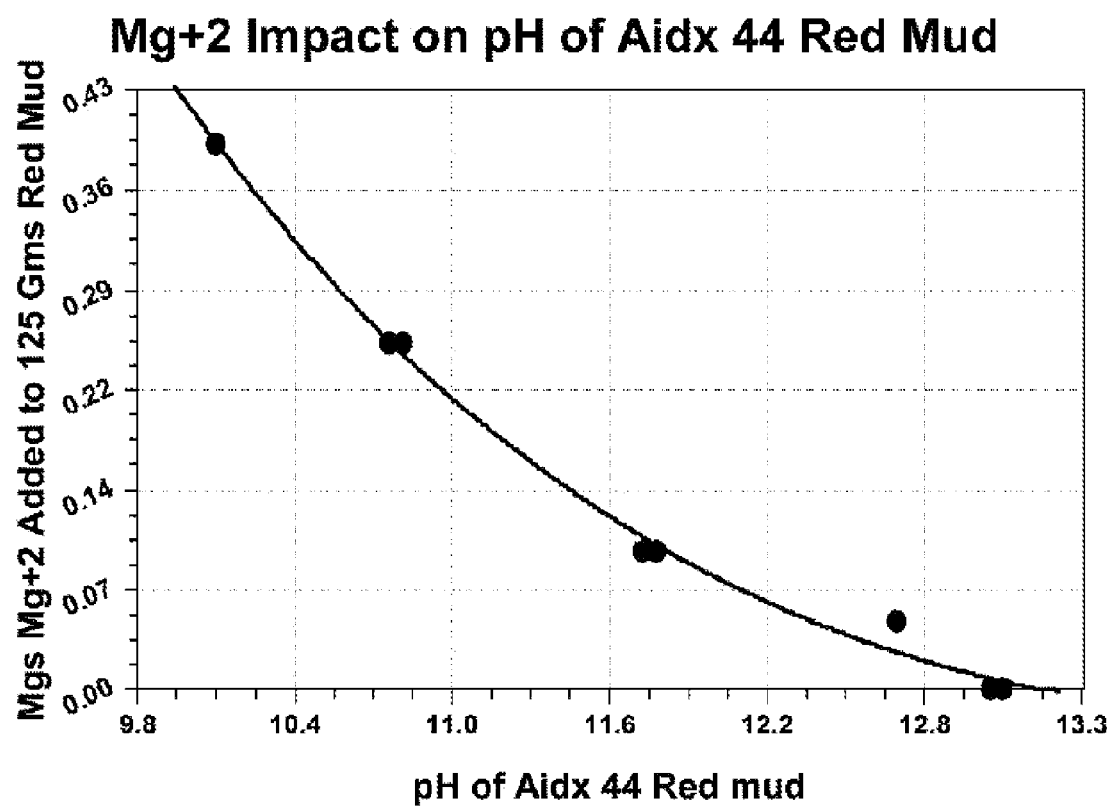

The raw test sample had a pH of 13 and specific gravity of 1.055 prior to treatment. A graph of treatment of a 125 gram sample with $Al^{+3}$ is shown in FIG. 3; a graph of treatment of a 125 gram sample with $Ca^{+2}$ is shown in FIG. 4, and a graph of treatment of a 125 gram sample with $Mg^{+2}$ is shown in FIG. 5. Relevant statistics and regression equations and for FIGS. 3, 4, and 5 are as follows.

FIG. 3: 3rd degree Polynomial Fit: $y=a+bx+cx^2+dx^3$;
Coefficient Data: a=10.8; b=3.48; c=0.390; d=−0.0146
Correlation Coefficient r=0.996; 0.99=$R^2$;
Standard Error in Y=0.016 g $Al^{+3}$
FIG. 4: Model: $y=(a+bx)/(1+cx+dx^2)$
Coefficient Data: a=61.3; b=−4.32; c=−26.3; d=2.56
Equation limited at X=~10.3
Correlation Coefficient: 0.985 $R^2$=0.97;
Standard Error in Y=0.17 g $Ca^{+2}$
FIG. 5: Model: $y=a+bx+c/X^2$
Coefficient Data: a=−2.98; b=0.138; c=202
Correlation Coefficient: 0.997; $R^2$=0.99;
Standard Error in Y=0.01 g $Mg^{+2}$ Regression equations expressed in terms of the gram mass of the elements $Al^{+3}$, $Ca^{+2}$, $Mg^{+2}$ and their pH, which are derived from graphs shown in FIGS. 3, 4, and 5, are shown below:

$Al^{+3}$:
pH of $Al^{+3}$ treated 44 Aidx Red Mud=$10.82-3.48*(Al^{+3})+0.390*(Al^{+3})_2-0.0146*(Al^{+3})_3$;
$R^2$ for this equation is 0.99 with a standard error of 0.016 $Al^{+3}$.

$Ca^{+2}$:
pH of $Ca^{+2}$ treated 44 Aidx Red Mud=$(61.3-4.32*(Ca^{+2}))/(1-26.3*(Ca^{+2})+2.56*(Ca^{+2})^2)$;
$R^2$ for this equation is 0.97 with a standard error of 0.17 g $Ca^{+2}$.

$Mg^{+2}$:
pH of $Mg^{+2}$ treated 44 Aidx Red Mud=$-2.98+0.138*(Mg^{+2})+202/(Mg^{+2})^2$
$R^2$ for this equation is 0.99 with a standard error of 0.01 g $Mg^{+2}$ Purpose of the Neutralization of Waste or by-Products Highly alkaline wastes and by-products, due to hydroxide concentrations, are often deemed dangerous or hazardous materials due to a high pH (typically >12) and must be rendered to a lower pH. It is desirous to minimize any volume or mass increase in this endeavor. Typical neutralization approaches fail to minimize waste mass increases.

If an alkaline waste is at a pH that is not deemed hazardous by local agencies, a lower pH is often desirable so that the alkaline material is more suitable for waste storage or for possible beneficial reuse.

An example of a large volume alkaline waste located at many places around the world from sites in East and West Europe, Africa, East and West Asia, Latin America, and North America is a highly alkaline spent bauxite residual from the Bayer process utilized by the alumina/aluminum industry. This alumina production process by-product is generically called "red mud." "Red mud" usually has a pH of over 13 when freshly produced due to the presence of residual sodium hydroxide. "Red mud" material is typically over pH 12 after aging in the drying lagoons or impoundments found at the alumina plant sites around the world. There have been approximately 6-7 million metric tons of "red mud" generated in the period 1990 through the second quarter 2003 (based on 1 ton red mud per ton of bauxite processed).

The use of this invention's poly cation salt neutralization technology would make the "red mud" amenable for safer long term storage and render it to a form that would make it suitable for study in the application of many possible recycle uses such a waste water filtration material, land amendments and restoration, and other waste treatments, all which would have economic as well as environmental benefit. Further, this invention's poly cation neutralization treatment significantly minimizes an increase in mass and/or volume of the "red mud" by-product.

A second example of a lower worldwide volume, highly alkaline, due to potassium hydroxide, waste material is found in the "alkaline battery" industry. The neutralization of this waste material with this poly cationic invention renders the alkaline battery waste non hazardous due to alkalinity while minimizing waste volume and mass and rendering it suitable for additional processing.

BEST MODE FOR CARRYING OUT THE INVENTION

This invention is suitable for application to any liquid, slurry, sludge or solid that may be wetted with water to a sludge with suitable salt dissolving ability to cause the salt, double cation exchange neutralization reaction to proceed. The salt or salt mixture chosen to run this neutralization reaction should be a salt with a solubility in 100 grams of water at room temperature of at least 0.5 grams. Poly cation salts such as $CaSO_4.0.5H_2O$ or $CaSO_4.2H_2O$ do not meet this requirement, yet each will have a small impact on reducing alkalinity in a waste or by-product, as shown in the invention description.

It is desirable to use a highly soluble salt such as ammonium aluminum alum or sodium iron (III) alum or magnesium sulfate heptahydrate or magnesium chloride or calcium chloride. Such salts will (a) thoroughly dissolve in water at temperatures around water's freezing to boiling points to an extent exceeding 15 grams per 100 mL of water and (b) produce a double substitution reaction hydroxide product such as shown in equation [I] that is at least as insoluble in water as $Ca(OH)_2$ is in cold and hot water.

The di-valent cation calcium is not the best element to use, if to be used alone, since it produces a slightly soluble precipitate in the double replacement reaction which causes the calcium cation to hit a maximum pH reduction limit near pH 10.5. A better mode would be to use the aluminum tri-valent cation from one of its several soluble salts.

The best mode decision for reducing a waste or by-product's hydroxide alkalinity could be controlled by what sort of eventual end use for the neutralized product is envisioned at the time of treatment. An example would be the neutralization of spent bauxite-alumina "red mud" for the eventual purpose of blending it into a useable soil material. In this case, the straight use of the neutralization efficient cation aluminum might be modified to include some magnesium and/or calcium in the neutralization process in order to make the treated material's agronomic characteristics better. If long term storage was the goal, then the use of aluminum would maximize results and minimize chemical treatment costs.

A Method of Double Replacement Cation Neutralization of High Alkalinity Waste Materials One embodiment of double replacement cation neutralization of high alkalinity waste materials comprises treating alkaline waste and by-products. The material is thus rendered, by use of aluminum poly cation salts, neutralized or reduced in pH, from near 14 to a minimum lower limit of about 5.3. The resulting waste or by-product stream is suitable for disposal or reuse.

Treatment includes contacting together, in a reaction mixture the high pH waste or by-product material, with sufficient water added or found within the alkaline material, with one or more poly cationic salts in the dry form taken from a group of salts containing trivalent aluminum, trivalent iron, divalent calcium, divalent zinc, divalent magnesium, divalent manganese or any polyvalent cationic salt that is soluble in water to a minimum extent of 0.5 grams per 100 milliliters of water at near 0° C., and 2 grams per 100 milliliters of water at near 100° C., in such a way to cause these materials to react to form a soluble salt reaction by-product and an insoluble hydroxide precipitate.

The level of pH reduction chosen and selection of the neutralizing cation or cations and the salt(s) in which they appear will control the percentage of each and total salt added to the individual waste/by-product reaction mixture.

Control of the chemical costs and the type and quantity of added metal content in the alkalinity/pH reduced material is facilitated.

The salt(s) may be dry or made up of a brine or dilute salt solution of the chosen salt. Salts are from the set of previously described poly cation salts suitable to reduce hydroxide alkalinity in waste and by-product materials. Addition of the poly cation salts causes the pH to drop immediately upon thorough mixing of the poly cation salts and the waste/product materials. The term "immediate," as used in this specification and appended claims, refers to a range from instantly upon complete dissolution of the poly cation salt(s), to within less than 30 minutes when the mixing process is difficult.

The temperature of the waste or by-product does not change the time of reaction meaningfully and in turn the pH level of the treated waste/by-product within 15 minutes of treatment. Accordingly, a process temperature of 60° C. versus a process temperature of 5° C. will show that the difference in pH within the first 1 to 30 minutes will be less than 0.5 pH units lower at the higher temperature for most wastes; and, more commonly less than 0.35 pH units.

In some embodiments, the poly cation salt neutralization process requires a determination of the level of alkalinity present in the waste or by-product in order to determine how much active ingredient needs to added in order to achieve the desired waste/by-product pH level.

This may be done through the use of the Alkalinity Index (Aidx) of the waste or by-product, which is determined by titrating the "to be treated" material with a 1 Normal Hydrochloric Acid, measuring the pH from the raw pH to a pH of 6.0. The curve generated by this titration should be integrated to yield an "area under the curve" of milliliters of 1 Normal HCl per gram of alkaline waste per change in waste pH, as shown in graphs presented in FIGS. 1 and 2. This area value becomes the Aidx value;

The Aidx value can then be used in a regression equation such as found in Table 2, as well as in the generation of a new factorial test design such as the examples provided in Tables 1, 5, and 13, leading to a process specific regression equation which will allow the optimization of the level of the specific poly cations chosen to treat the waste or by-product.

The invention claimed is:

1. A method of treating an alkaline by-product comprising:
combining a cation with the alkaline by-product, the alkaline by-product having a pH of 7.5-14, and the cation having a valence of +2 or greater and being in a physical form selected from the group consisting of (i) an undissolved salt and (ii) a salt dissolved in water at a concentration of 15 grams or more of the salt per 100 mL water; and
generating a precipitate, the precipitate comprising the cation and a hydroxide ion.

2. The method of claim 1, wherein the cation is selected from the group consisting of $Al^{+3}$, $Fe^{+3}$, $Mg^{+2}$, $Zn^{+2}$, and $Mn^{+2}$.

3. The method of claim 2, wherein the alkaline by-product is red mud generated by a Bayer process.

4. A method of creating a hydroxide salt comprising combining a neutralization salt with an alkaline by-product, the alkaline by-product having a pH of 7.5-14 and the neutralization salt being in at least one of two physical forms, the two physical forms being (i) an undissolved solid, and (ii) dissolved in water at a concentration of 15 grams or more of the neutralization salt per 100 mL water, wherein the hydroxide salt includes a cation and a hydroxide ion at a ratio of two or more of the hydroxide ions for each one of the cations.

5. The method of claim 4, wherein the hydroxide salt is precipitated from aqueous solution.

6. The method of claim 5, wherein the alkaline by-product is red mud generated by a Bayer process.

7. The method of claim 6, wherein the cation is selected from the group consisting of $Al^{+3}$, $Fe^{+3}$, $Mg^{+2}$, $Zn^{+2}$, and $Mn^{+2}$.

* * * * *